United States Patent

Cricchi et al.

[15] 3,641,511

[45] Feb. 8, 1972

[54] COMPLEMENTARY MOSFET INTEGRATED CIRCUIT MEMORY

[72] Inventors: James R. Cricchi, Baltimore; Edgar D. Lancaster, Jr., Linthicum Heights, both of Md.

[73] Assignee: Westinghouse Electric Corporation, Pittsburgh, Pa.

[22] Filed: Feb. 6, 1970

[21] Appl. No.: 9,381

[52] U.S. Cl. .....................340/173 R, 340/173 FF, 307/238, 307/279

[51] Int. Cl......................G11c 11/40, G11c 5/02, G11c 7/00

[58] Field of Search.......................340/173 R; 307/238, 279

[56] References Cited

UNITED STATES PATENTS

| | | | |
|---|---|---|---|
| 3,355,721 | 11/1967 | Buons | 340/173 |
| 3,440,444 | 4/1969 | Rapp | 340/173 X |
| 3,493,786 | 2/1970 | Ahrons | 340/173 |
| 3,521,242 | 7/1970 | Katz | 340/173 |
| 3,533,087 | 10/1970 | Zuk | 340/173 |

*Primary Examiner*—Stanley M. Urynowicz, Jr.
*Attorney*—F. Shapoe and C. L. Menzemer

[57] ABSTRACT

A random access nondestructive voltage readout complementary MOSFET memory fabricated on a single integrated circuit "chip," including not only a plurality of identical memory cells arranged in a matrix array, but also the digital address decoding logic circuitry as well as the input/output buffer circuitry including data line driver circuits insulating the memory cell array from external data lines and input/output control logic circuits insulating the address decoding logic circuitry and the data line driver circuits from external read/write control and strobe input sources. Both N-channel and P-channel MOSFETS are fabricated adjacent to one another as complementary pairs on the same "chip" with the exclusion of at least one guard ring diffusion region between adjacent drain diffusion regions of the complementary pairs by the inclusion of a relatively thick oxide layer (15–20 KA.) which operates to minimize internal interconnection line capacitance and parasitic surface channels. The data line drivers are bidirectional to provide nondestructive readout, fast readout response, noisy immunity and low-input capacitance. Each memory cell is comprised of two pairs of complementary MOSFETS coupled together as cross-coupled inverter circuits. Additionally, each cell is provided with a pair of parallely connected complementary MOSFETS acting as an input/output transmission switch and are coupled to a common input/output internal data line and operated by separate address command signals from the address decoding logic circuit. Another pair of parallely connected complementary MOSFETS are coupled to the memory cell as a feedback transmission switch and are operated by still other separate address command signals from the address decoding logic circuit. The address command logic utilized to operate the parallely connected pairs comprising the input/output transmission switch and the feedback transmission switch is timed to permit nondestructive readout of the memory cell.

13 Claims, 12 Drawing Figures

FIG. 1
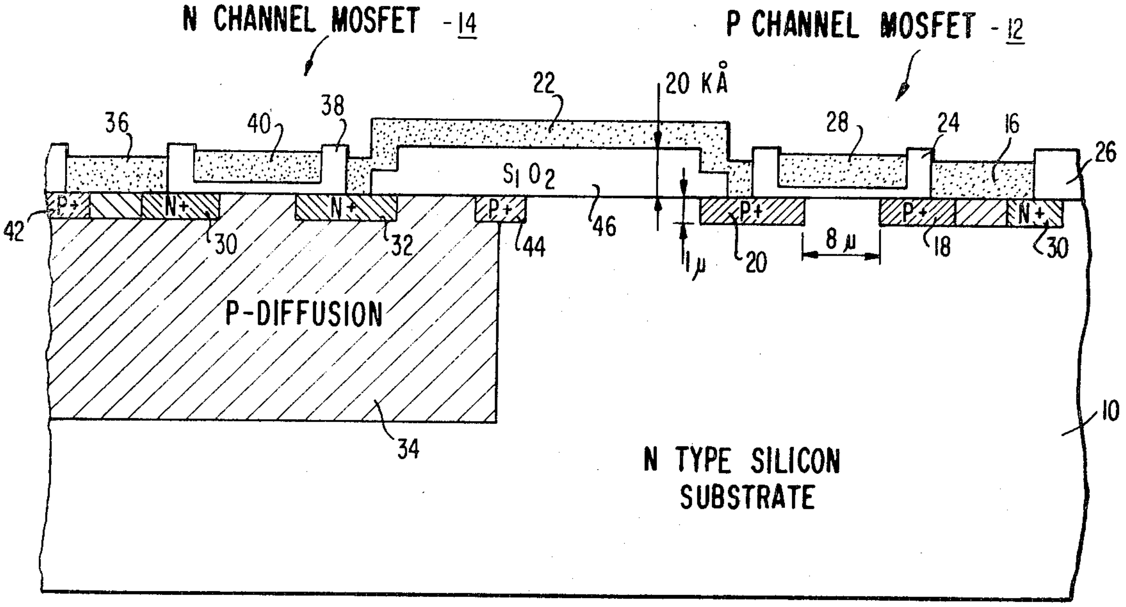
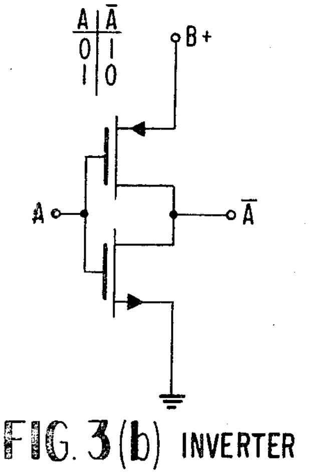
FIG. 3(b) INVERTER
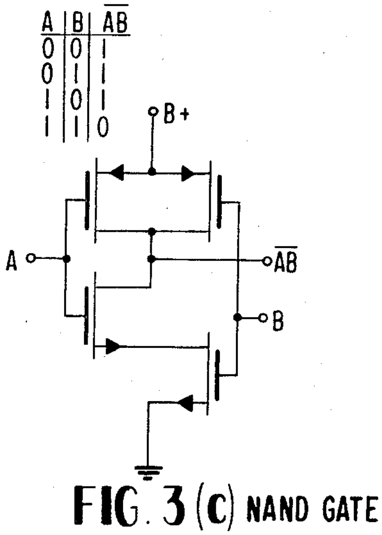
FIG. 3(c) NAND GATE
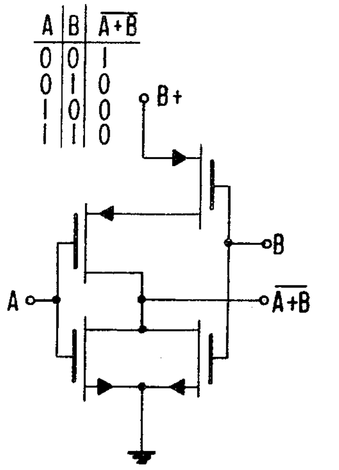
FIG. 3(d) NOR GATE
FIG. 3(a) TRANSMISSION SWITCH
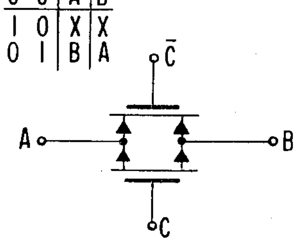

COMPLEMENTARY MOSFET INTEGRATED CIRCUIT MEMORY

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates to a high-speed memory for a data processing system in which all of the active elements are comprised of metal oxide semiconductor field effect transistors hereinafter referred to as MOSFETS fabricated as integrated circuits on a substrate of semiconductor material which may be, for example, silicon. More particularly, the present invention is directed to a complementary MOSFET integrated circuit memory wherein the memory cell array, the address decoding logic circuitry, the input/output control logic circuitry and the data line driver circuitry for the memory cell array are all fabricated on a single semiconductor "chip."

2. Description of the Prior Art

Memories utilizing field effect transistors are well known to those skilled in the art. For example, U.S. Pat. No. 3,387,286, issued to R. H. Dennard, discloses one such teaching. Another example is disclosed in an article entitled "A Suitcase-sized Computer Memory. . . " by D. E. Brewer, et al., appearing in *Electronics*, Nov. 13, 1967, at pages 138–146, inclusive. Also, binary memory elements employing complementary insulated gate field effect transistors and a memory array comprised thereof is disclosed in U.S. Pat. No. 3,355,721, issued to J. R. Burns. The storage disclosed therein is directed to a current sensing system as opposed to a voltage sensing system. Other current sensing memories are disclosed in U.S. Pat. No. 3,389,383, issued to H. J. Burke, et al. and U.S. Pat. No. 3,275,996, issued to J. R. Burns.

SUMMARY

Briefly, in accordance with the present invention, a random access nondestructive voltage readout memory is provided in an integrated circuit structure in which complementary MOSFETS are diffused in the same semiconductor substrate and interconnected internally to provide not only a memory cell array but also the address decoding logic, the input/output control logic and input/output data line drivers for the memory cell array on the same substrate. The address decoding logic receives four address inputs and generates four address command signals per word which are fed to each bit of the word in response to a read/write control signal and a strobe control signal. Additionally, each memory cell is coupled to a respective external data line by means of a respective internal data line and data line driver circuit which operates to provide nondestructive readout, fast response, noise immunity and low input capacitance for each of the memory cells. Each memory cell of the array includes a first and second cross-coupled inverter circuit forming a flip-flop, an input/output transmission switch and a feedback transmission switch. Both inverter circuits are comprised of complementary MOSFETS and the input/output and feedback transmission switches are comprised of pairs of parallelly connected complementary MOSFETS having their gate electrodes separately coupled to one respective command signal of the four address command signals from the address decoding logic circuitry for being selectively addressed and providing read, write, and storage of a binary logic signal to and from the common input/output internal data line.

The complementary MOSFETS are fabricated on the substrate so that extremely high MOSFET density is achieved by means of fabricating N-channel MOSFETS adjacent to P-channel MOSFETS with reduced parasitic leakage and internal line capacitance being reduced through the use of one P+ guard ring diffusion region for the N-channel MOSFET and a relatively thick (15–20 KA.) oxide layer for an N-type substrate between the P+ drain diffusion region of the P-channel MOSFET and the N+ drain diffusion region of the N-channel MOSFET

BRIEF DESCRIPTION OF THE DRAWINGS

FIG. 1 is a partial cross-sectional view of an N-type silicon substrate illustrating an adjacent N- and P-channel MOSFET fabricated thereon in accordance with the teachings of the subject invention;

FIG. 3(*a*)–3(*d*) are schematic diagrams of basic complementary MOSFET logic circuits utilized by the subject invention;

DESCRIPTION OF THE PREFERRED EMBODIMENT

Figure 2:
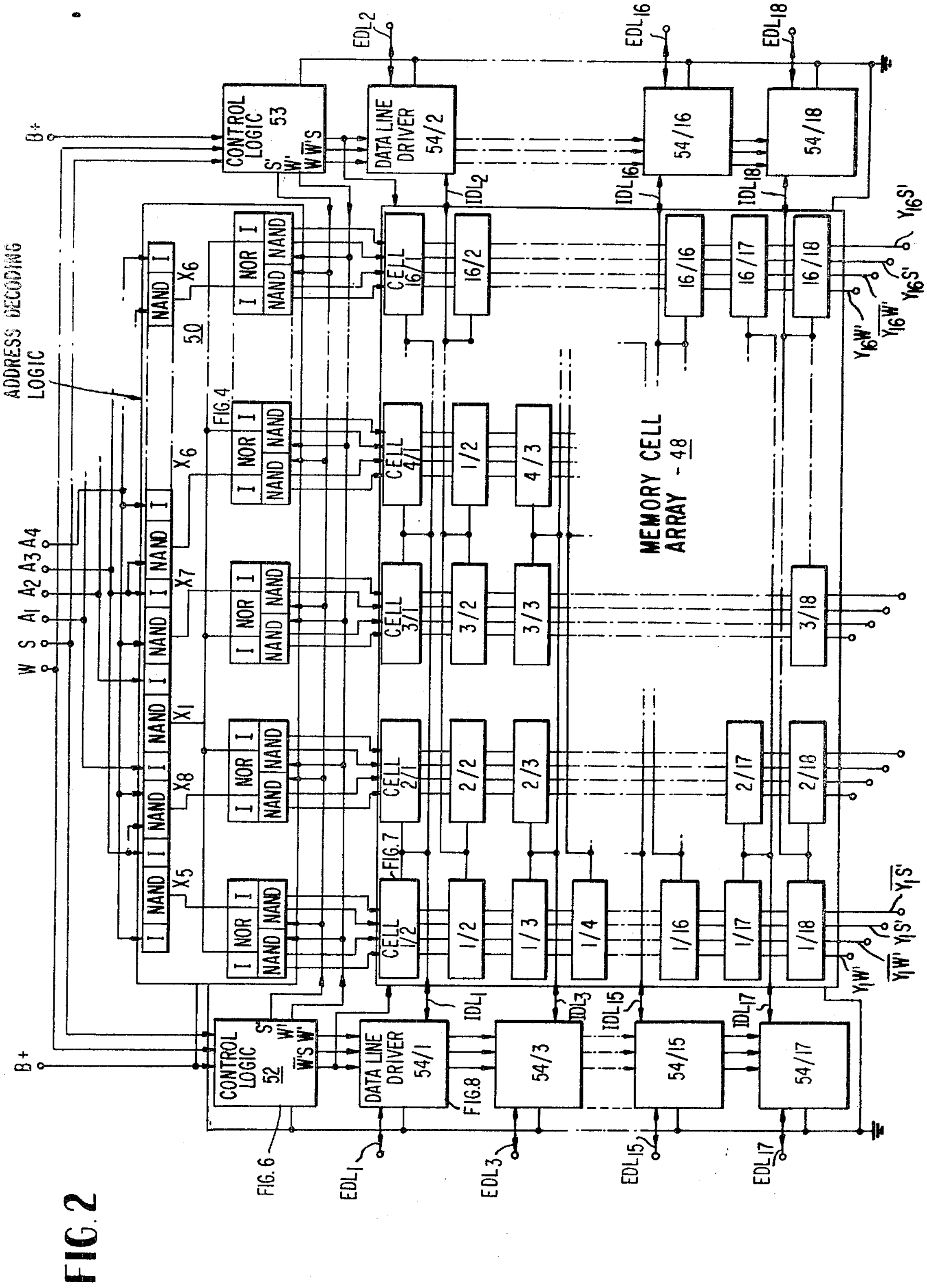
FIG. 2 is a block diagram of the subject invention comprising a 16-word by 18-bit memory fabricated on a single semiconductor substrate.

Before considering the subject invention in detail, it should be pointed out that the semiconductor elements contemplated for use in practicing the invention constitute metal oxide semiconductor field effect transistors hereinafter referred to simply as MOSFETS. These devices have first and second terminals defining the ends of the current carrying or conduction path and a control terminal that conducts substantially no current under steady state input conditions. These terminals are referred to as the source, drain and gate, respectively. The MOSFET may be defined generally as a majority carrier device that comprises a body or substrate of semiconductive material having a source and a drain region in contact with the substrate and defining the ends of a conduction or current carrying path through the substrate. The gate (control) overlies at least a portion of the conduction path and is separated therefrom by an insulator or region of insulating material which may be, for example, silicon dioxide ($SiO_2$) which is often referred to simply as an oxide layer. Since the gate is insulated from the substrate of semiconductive material, it does not draw any current under steady state operating conditions or at least it draws no appreciable current. The gate of one transistor thus may be connected directly to the drain of another transistor and there is little or no steady state current flow therethrough, or power dissipated in the connection.

Signals or voltages applied to the gate control the impedance of the conduction path between the source and drain. MOSFETS may be of either the enhancement type or the depletion type. The enhancement type is of particular interest in the present application. In an enhancement-type device, the conductivity of the conduction path is low and only a very small leakage current flows between source and drain when the gate or source have the same voltage. The transistor is biased "on" when the gate voltage differs from the source voltage in a specified polarity direction. The conductivity of the conduction path in an "on" transistor is a function of the voltage difference between the source and the gate.

A MOSFET may be either a P-channel device or an N-channel device, depending upon the conductivity type of material of the semiconductor. A P-channel device is one in which the majority carriers are holes, whereas in an N-channel device, the majority carriers are electrons. According to this definition, a P-channel enhancement mode MOSFET is one that has a relatively high conductivity conduction path when the gate voltage is negative relative to the source voltage; the N-channel enhancement mode MOSFET has a relatively high conductivity conduction path when its gate voltage is positive relative to the source voltage. A P-channel MOSFET is identified in the drawings by an arrowhead pointing toward the unit and located on the terminal that usually functions as the source. Additionally, the device is bidirectional and an electrode may function as a source under one set of operating conditions and may function as the drain under other operating conditions in the same circuit. An N-channel MOSFET is identified in the drawings by an arrowhead pointing away from the unit. For a detailed discussion of this type of semiconductor device reference is made to the publication "IEEE Transactions on Electronic Devices," July 1964, pages 324–345, inclusive.

Considering now the drawings and particularly to FIG. 1, there is disclosed the manner in which complementary MOSFETS (N-channel and P-channel) in the present invention are fabricated on a common substrate to provide a high-density configuration of MOSFET devices while at the same time minimizing internal interconnection line capacitance and parasitic surface channels, the latter causing undesirable shorts and inversion regions. The present invention contemplates utilizing a "chip" or substrate 10 comprised of <100> or <111*S* orientation N-type silicon having $1\times10^{15}$ to $1\times10^{16}$ carriers/cm.$^3$. A P-channel MOSFET 12 and an N-channel MOSFET 14 are fabricated adjacent each other on the substrate 10 by means of a low surface concentration diffusion process outlined in FIG. 9, thereby providing a complementary MOSFET configuration. The P-channel MOSFET 12 includes a source terminal 16 comprising a metallic contact region contiguous to a P+ source diffusion region 18 which is in the order of 1 micron ($1\mu$) thick. Separated by a distance of substantially 8 microns ($8\mu$) is a P+ drain diffusion region 20 contiguous to a drain terminal 22 comprising a metallic ohmic contact common to the N-channel MOSFET 14. An insulating layer of silicon dioxide ($SiO_2$) identified by reference numeral 24 is deposited on the surface 26 of the substrate 10 between the regions 18 and 20. A gate terminal 28 comprising a metallic ohmic contact is deposited on the oxide layer 24. An N+ diffusion region 30 constitutes an ohmic contact to the substrate 10.

The N-channel MOSFET 14 on the other hand is comprised of an N+source and drain diffusion region 30 and 32, respectively in a P− diffusion region 34. A source terminal 36 comprising a metallic ohmic contact is contiguous to the source diffusion region 30 while the drain terminal for the drain diffusion region 32 comprises the drain terminal 22 common to the P-channel MOSFET 12. A second insulating oxide layer 32 is deposited on the surface 37 of the P− diffusion region 34 between the source and drain diffusion regions 30 and 32. A gate terminal 40 comprising a metallic ohmic contact is deposited on the oxide layer 38. A P+diffusion region 42 provides an ohmic contact to the P− diffusion region 34 in substrate 10.

A P+ diffusion region 44 constitutes a guard ring for the elimination of parasitic surface channels between the N-channel and P-channel MOSFET 14 and 12. Normally, the P-channel MOSFET 12 would also include a similar but N+ guard ring diffusion region; however, in the subject embodiment of the present invention, the second guard ring is eliminated by the inclusion of a relatively thick third oxide layer 46, deposited on the surfaces 26 and 37 between the P+drain diffusion region 20 and the N+ drain diffusion region 32. The thickness of the oxide layer 46 is in the order of 15–20 KA. where the thickness of the drain and source diffusion regions are in the order of 1 micron. As shown in FIG. 1, the terminal 22 which comprises a common drain terminal is deposited over the oxide layer 46. In addition to eliminating parasitic surface channels, the thickened oxide layer 46 minimizes internal interconnection line capacitance which as will hereinafter be pointed out is vital to proper operation of the nondestructive readout of the memory.

FIG. 2 discloses a block diagram of a memory utilizing complementary MOSFETS such as shown in FIG. 1 for providing random access and nondestructive voltage readout. The embodiment shown in FIG. 2 discloses a memory comprising a 16-word by 18-bit memory cell array 48 including cells 1/1 through 16/18. Coupled to the memory cell array 48 is an address decoding logic circuit 50 which receives four address inputs $A_1$, $A_2$, $A_3$ and $A_4$ from an address source, not shown. The address decoding circuit 50 additionally receives a read/write control input W′ and a strobe input S′ from input/output control logic circuits 52 and 53 which act as buffer circuits between the memory and a read/write control source, not shown, and supplying a control signal W and strobe signal control source, not shown, supplying a control signal S. From the six inputs $A_1 \ldots A_4$, S′ and W′, the address decoding circuit 50 couples four address command signals YW′, $\overline{YW'}$, YS′ and $\overline{YS'}$, to each of the 16 words of the array so that for example word numeral 1 receives address command input signals $Y_1W'$, $\overline{Y_1W'}$, $Y_1S'$ and $\overline{Y_1S'}$, etc. Each memory cell 1/1 . . . 16/18 of the array 48 is coupled to a respective external digit data line $EDL_1 \ldots EDL_{18}$ by means of a data line driver circuit 54/1 . . . 54/18. The odd-numbered data line drivers 54/1, 54/3 . . . 54/17 receive control inputs W′ and $\overline{W'}$ S from the control logic circuit 52 and couple respective internal data lines $IDL_1$, $IDL_3 \ldots IDL_{17}$ to the memory cell array so that for example bit 1 of all 16 words are commonly connected to internal data line $IDL_1$. In a like manner, the even-numbered data line driver circuits 54/2, 54/4 . . . 54/18 are coupled to the control logic circuit 53 which also receive inputs of control logic signals W′ and $\overline{W'}$ S. The data line driver circuits 54/2, 54/4, . . . 54/18 are coupled to respective internal data lines $IDL_2$, $IDL_4 \ldots IDL_{18}$. These internal data lines couple to the even numbered bits of the array 48. For example, the internal digit data line $IDL_2$ couples the digit data line driver 54/2 to bit 2 of all 16 words comprising cells 1/2 . . . 16/2.

The embodiment of the subject invention as shown in FIG. 2 operates in response to positive binary digital logic wherein 0 volts represents a logical "0" level and the supply voltage B+ represents a logical "1" level. Binary digital data appearing on the external digit data lines $EDL_1 \ldots EDL_{18}$ are fed into and stored in the memory cell array 48 in response to specific address command signals $Y_xW'$, $\overline{Y_xW'}$, $Y_xS'$, and $\overline{Y_xS'}$ where *x* designates any word of the array when the respective data line driver circuit 54/1 . . . 54/18 are simultaneously enabled by the control signals $\overline{W'}$S and W′. A readout from the memory cell array is achieved by selective address of the memory cells 1/1 . . . 16/18 when the strobe signal S′ is a logic "1" and the read/write control signal W′ is a logic "0." The foregoing brief description of operation will become evident as a more detailed description of the various portions of the memory shown in FIG. 1 continues as each individual section of the memory is described.

Considering now FIGS. 3(*a*)–3(*d*), there is schematically disclosed four basic complementary MOSFET logic circuits utilized to configure the various portions of the memory shown in FIG. 2. FIG. 3(*a*) for example illustrates a complementary pair of MOSFETS connected in parallel by their drain and source terminals to form a transmission switch and operates such that when the input signals C and $\overline{C}$ having respective logic levels of "0" and "1" are applied to the respective gate terminals, both MOSFETS are nonconductive and the switch is open; however, when either C or $\overline{C}$ is a logic "1,"the switch is conductive as shown by the truth table associated therewith.

FIG. 3(*b*) discloses a complementary MOSFET inverter circuit wherein the gate and drain terminals of the MOSFET pair are common to each other and a B+supply potential is applied to the source terminal of the P-channel device while the source terminal of the N-channel device is returned to a reference potential illustrated as ground. It should be observed, however, that when desirable, the ground termination of the source of the N-channel device may be replaced by a B− supply potential. As evidenced by the truth table, a signal A applied simultaneously to the gate terminals appears at the common drain terminals as a signal $\overline{A}$. This circuit schematically represents the complementary configuration shown in FIG. 1. Similarly, FIGS. 3(*c*) and 3(*d*) disclose two pairs of complementary MOSFETS connected together to form well-known NAND and NOR gates.

Figure 4:
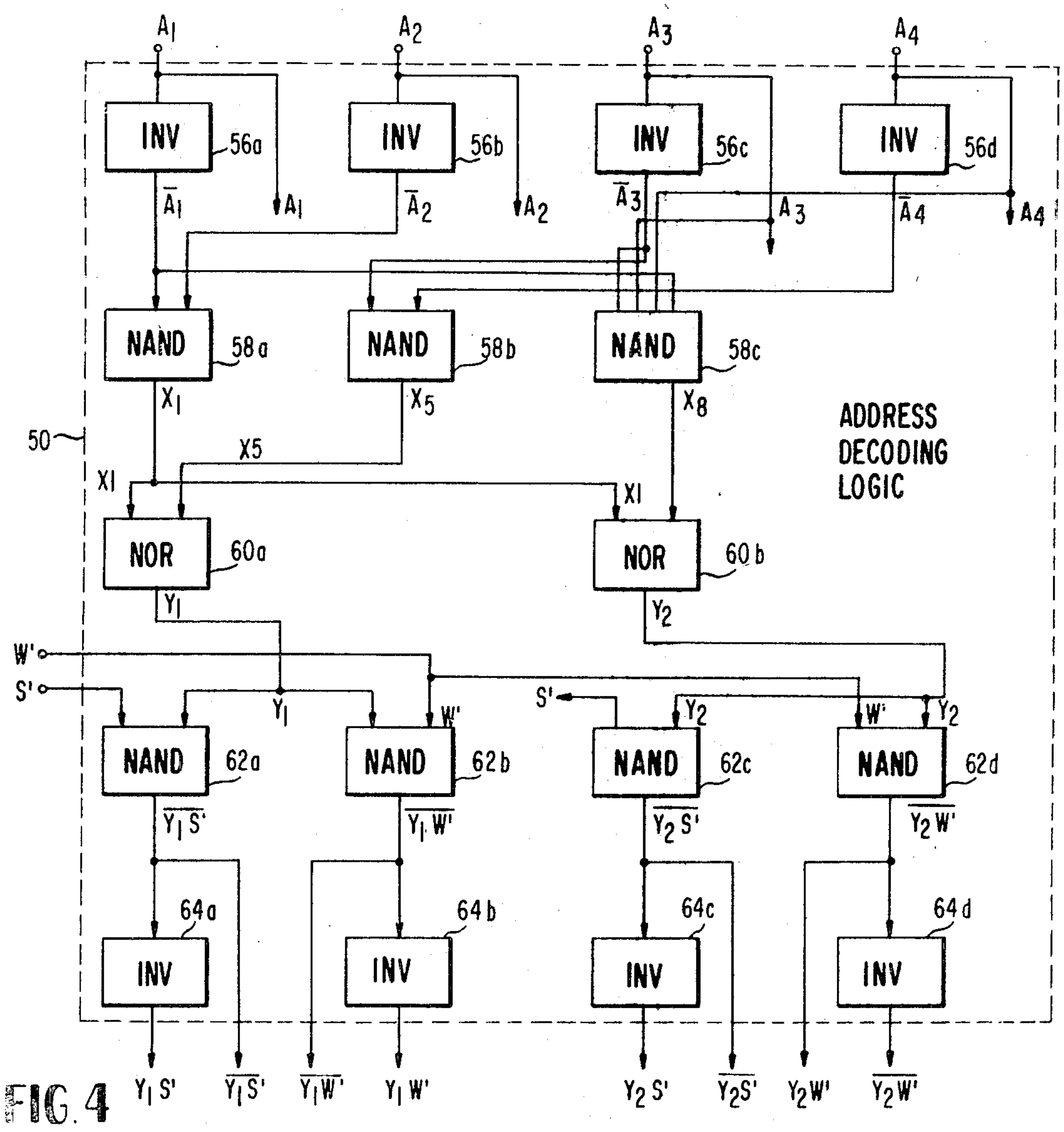
FIG. 4 is a partial electrical block diagram of the address decoding logic circuitry shown in FIG. 1.

Referring now to FIG. 4, there is disclosed a partial block diagram of the address decoding logic circuit 50 shown in FIG. 1. The arrangement of the elements in FIG. 1 is purely for purposes of convenience when considering placement or location of logic circuits in an integrated circuit structure or chip. The address decoding logic circuitry shown in FIG. 4 is disclosed sufficient to illustrate the generation of the four address command signals $Y_1S'$ . . . $\overline{Y_1W'}$ and $Y_2S'$ . . . $\overline{Y_2W'}$ for words 1 and 2 of the memory array 48. The four address input signals $A_1$, $A_2$, $A_3$ and $A_4$ are coupled into inverter circuits **56*a*, 56*b*, 56*c*, and 56*d*, respectively, providing outputs of $\overline{A}_1$, $\overline{A}_2$, $\overline{A}_3$, etc. The signals $\overline{A}_1$ and $\overline{A}_2$ are fed into a NAND-circuit 58*a* while the signals $\overline{A}_3$ and $\overline{A}_4$ are fed into the NAND-circuit 58*b*. A third NAND-circuit 58*c* is disclosed and receives four inputs comprising the signals $\overline{A}_1$, $A_3$, $\overline{A}_3$ and $A_4$. The output of the NAND-circuit 58*a* is identified as $X_1$ while the outputs of NAND-circuits 58*b* and 58*c* are labeled $x_5$ and $x_8$ respectively. Next the signals $X_1$ and $X_5$ are fed into a NOR-circuit 60*a* which provides an output signal of $Y_1$. A second NOR-circuit 60*b* receives inputs of $X_1$ and $X_8$ to provide an output of $Y_2$. The combination of the inverter circuits 56*a* and 56*b* and the NAND-circuits 58*a* providing output signals of $X_1$ comprises a first level of address decoding. The NOR-circuits 60*a*** converting the first level signals $X_1$ and $X_5$ to Y signals comprises a second level of address decoding.

Continuing further, a second plurality of NAND-circuits **62*a*, 62*b*, 62*c*, 62*d* are fed to the second level signals $Y_1$ and $Y_2$ as well as the read/write control and strobe signals W' and S' from the control logic circuitry 52 and 53 as shown in FIG. 1. More particularly, NAND-gate 62*a* receives an input S' and $Y_1$ to provide an output $\overline{Y_1S'}$. NAND-circuit 62*b* on the other hand receives an input of W' and $Y_1$ providing an output of $\overline{Y_1W'}$. Signals $\overline{Y_1S'}$ and $\overline{Y_1W'}$ comprise two of the necessary address command signals fed to each bit of the first word including cell 1/1, cell 1/2, . . . cell 1/18. The other two address command signals $Y_1S'$ and $Y_1W'$ are provided by inverter circuits 64*a* and 64*b*. The address command signals $Y_2S'$, $\overline{Y_2S'}$, $Y_2W'$ and $\overline{Y_2W'}$ are provided in the same fashion by means of the NAND-circuits 62*c* and 62*d* as well as the inverter circuits 64*c* and 64*d***.

It should be pointed out that the inverter circuits **64*a*, 64*b*, etc., are designed to incorporate a predetermined time delay by well-known fabrication techniques such as changing the output transconductance of the MOSFET semiconductive devices included therein and thereby changing the rate of change of voltage of the devices. This time delay manifests itself for example by reference to the waveforms in FIG. 5 and the waveforms labeled YS' and $\overline{YS'}$ as well as YW' and $\overline{YW'}$. Also in connection with the waveforms illustrated in FIG. 5, it should be pointed out that the W' waveform goes from a logic "0" level to the logic "1" level prior to the waveform S' which is representative of the strobe control signal. This exists for proper operation of the individual memory cells of the array 48** as will be explained subsequently.

Additionally, the operation of the invention is constrained to allow the address input signals $A_1$, $A_2$, etc., to change only when the strobe signal S and S' are at a logic "0"; however information can only be translated to and from a memory cell when S' is at a logic "1" level. This will also become evident when the subsequent discussion of the memory cell shown in FIG. 8 is considered.

Figure 5:
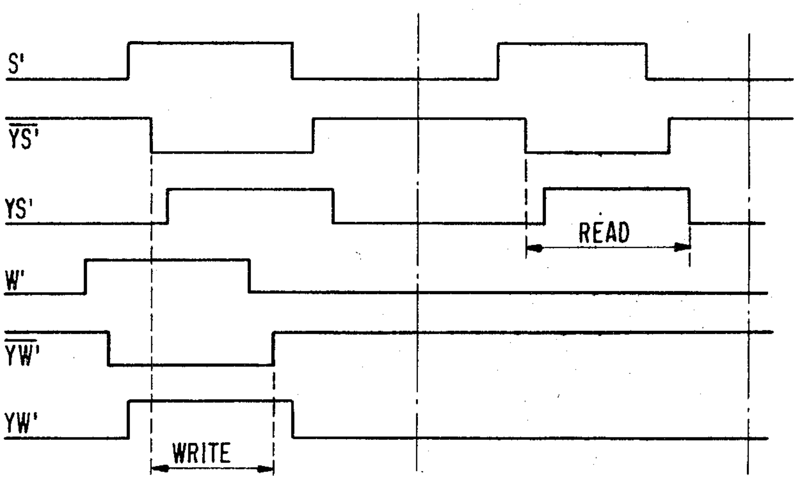
FIG. 5 is a set of voltage waveforms helpful in understanding the operation of the subject invention.
Figure 6:
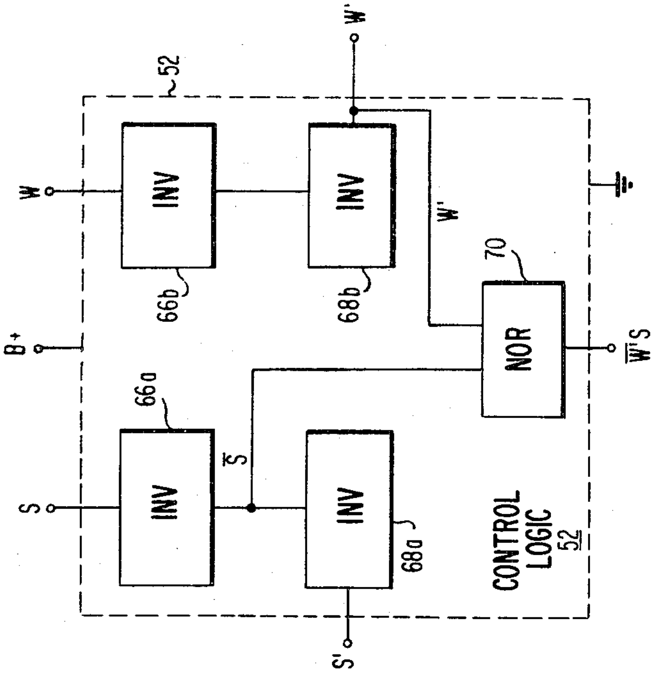
FIG. 6 is an electrical block diagram of one input/output control logic circuit shown in FIG. 1.

Attention now is directed to FIG. 6 which illustrates one of the input/output control logic circuits 52 of the identical circuits 52 and 53 which is a buffer circuit between the externally applied read/write control signal W and strobe signal S and the address decoding circuitry 50. The control logic circuitry 52 for example, is comprised of four inverter circuits **66*a*, 66*b*, 68*a* and 68*b*, as well as a NOR-circuit 70. The inverter circuits 66*a* and 66*b* receive input signals of S and W corresponding to the read/write control signal and a strobe control signal from an external source not shown and having a timing relationship such as shown with respect to the waveform S' and W' in FIG. 5. This can be achieved either at the control source, or preferably by incorporating a time delay in the inverter circuit 68*a*. The NOR-circuit 66*a* provides an output signal of $\overline{S}$ whereas the inverter circuit 66*b* provides an output of $\overline{W}$. The signal $\overline{S}$ is applied simultaneously to the input of the inverter circuit 68*a* and the NOR-circuit 70. The output of the inverter circuit 68*a* then becomes S', which is then fed to the address decoding circuitry as shown in FIG. 4. Considering the W input which is defined as having a logic "0" level in the read mode and a logic "1" level in the write mode, it is applied to the inverter 66*b* where its output becomes $\overline{W}$. The signal $\overline{W}$ is fed to the inverter 68*b* which provides the output W' which is then coupled to the address decoding circuitry shown in FIG. 4. The read/write control signal W' is additionally fed directly to the data line driver circuits 54/1 . . . 54/18 as shown in FIG. 1 as well as to the NOR-circuit 70**, whereupon an output therefrom identified as the signal $\overline{W}$'S is also applied thereto.

Figure 8:
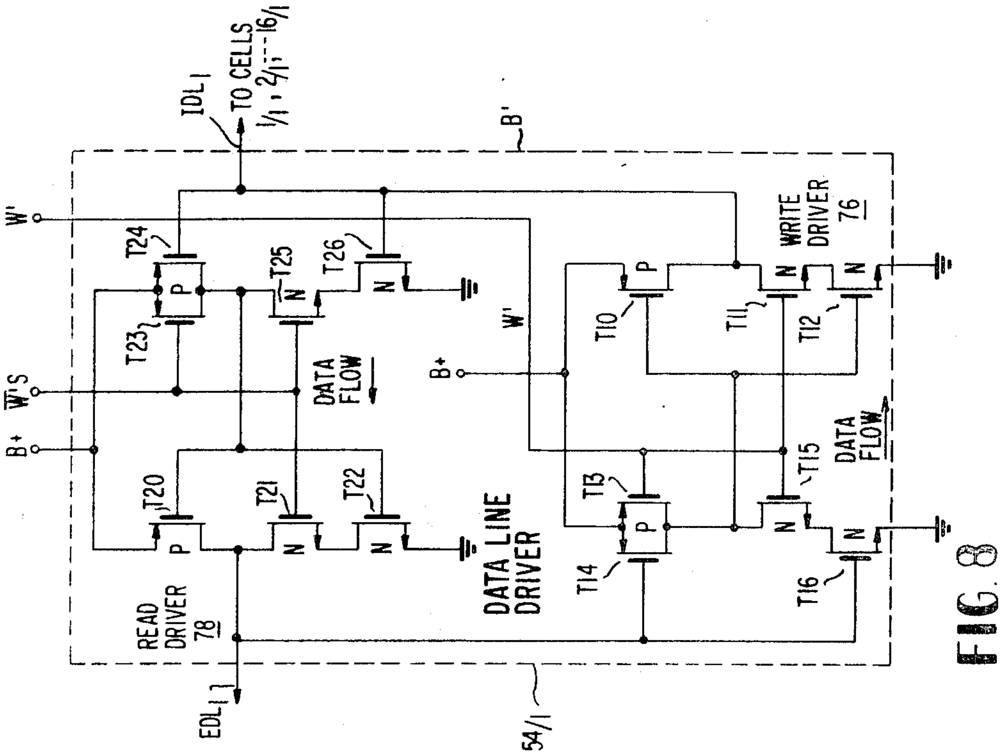
FIG. 8 is an electrical schematic diagram of an internal data line driver utilized in the memory shown in FIG. 1.
Figure 7:
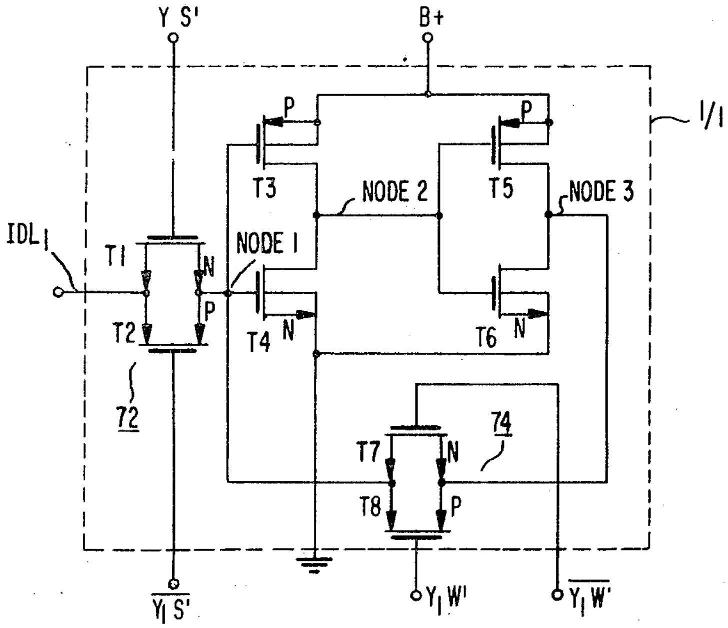
FIG. 7 is an electrical schematic diagram of a memory cell utilized in the memory cell array shown in FIG. 1.

Prior to considering the data line driver circuits 54/1 . . . 54/18 in detail as shown in FIG. 8, attention is directed first to a typical circuit configuration of the memory cells utilized in making up the array 48 shown in FIG. 7. For example, the memory cell 1/1 is shown in FIG. 7 and includes an input/output transmission switch 72 comprising MOSFETS T1 and T2 coupled together in parallel such as shown in FIG. 3(*a*). T1 comprises an N-channel device while T2 comprises a P-channel MOSFET. The gate of MOSFET T1 is coupled to the address command signal $Y_1S'$ while the gate of MOSFET T2 is connected to the address command signal $\overline{Y_1S'}$ fed from the address decoding circuitry 50 shown in FIG. 4. One terminal, either the drain or source, of the MOSFETS T1 and T2 are commonly connected to the internal digit data line $IDL_1$ which is coupled to data line driver 54/1 shown in FIG. 2. The remaining terminal of MOSFETS T1 and T2 are commonly coupled to the circuit mode 1 which is directly connected to the gate terminals of the complementary pair of MOSFETS T3 and T4 which are coupled together as a first inverter circuit between the supply potential B+ and ground. A second inverter circuit is coupled to the first inverter at circuit node 2 and is comprised of the complementary pair of MOSFETS T5 and T6 having their gate terminals commonly connected to the drain terminals of MOSFETS T3 and T4. Finally, a feedback transmission switch 74 comprising the parallel connected pair of complementary MOSFETS T7 and T8 are coupled between the drain terminals or circuit node 3 of MOSFETS T5 and T6 back to the gate terminals of MOSFETS T3 and T4 which is defined as circuit node 1. Similarly, circuit nodes 2 and 3 are defined as the direct connection between the drains of MOSFETS 3 and 4 and the gates of MOSFETS 5 and 6, and the connection between the drains of MOSFETS 5 and 6 and the connection to the MOSFETS 7 and 8. It should be pointed out that MOSFET 7 is an N-channel device having its gate terminal coupled to the address command signal $\overline{Y_1W'}$ whereas MOSFET T8 is a P-channel device having its gate connected to the address command signal $Y_1W'$.

The operation of the memory cell shown in FIG. 8 can best be understood by referring to the waveforms shown in FIG. 5. First considering the "write" mode, FIG. 5 indicates that the address command signals $Y_1W'$ and $\overline{Y_1W'}$ appear first in time and $\overline{Y_1W'}$ leads $Y_1W'$ and goes from logic "1" to "0" while $Y_1W'$ subsequently goes from a logic "0" to a "1" to turn the feedback transmission switch 74 "off" due to the fact that the signal $Y_1W'$ applied to MOSFET T8 when it goes from a logic "0" to a logic "1" causes the P-channel device to become nonconductive. In the same fashion, the signal $\overline{Y_1W'}$ going from a logic "1" to "0" turns the N-channel MOSFET T7 "off." This establishes an open circuit between nodes 1 and 3. Following this, the address command signal $\overline{Y_1S'}$ is applied to the P-channel MOSFET T2, which turns "on" when the signal goes from a logic "1" level to "0." At a predetermined time delay later the address command signal $Y_1S'$ is applied to the gate of the N-channel MOSFET T1, turning it "on." The input/output transmission switch 72 thus being completely conductive directly connects the internal digit data line $EDL_1$ directly to node 1. If for example a logic "1" signal (B+) appears on $EDL_1$, node 1 will have a B+ potential applied thereto which turns MOSFET T4 "on" and turns MOSFET T3 "off." Node 2 is now at ground potential and MOSFET T5 turns "on" while T6 turns "off." The turning "on" of MOSFET T5 applies the B+ potential to node 3. Next the feedback transmission switch is turned "on" by the address command signals $Y_1W'$ and $\overline{Y_1W'}$ providing a direct connection between node 1 and node 3, thereby latching the memory cell. A logic "1" signal is then said to be written into the memory cell 1/1. Finally, after the feedback transmission switch is opened, address command signals $\overline{Y_1S'}$ and $Y_1S'$ turn the input/output transmission switch "off" isolating the memory cell 1/1 from the internal input data line $IDL_1$. It should be observed that the strobe control signal S' is utilized for controlling the input/output transmission switch 72 while the read/write signal W' is used to control the feedback transmission switch 74.

An intermediate or storage condition occurs whenever the $Y_1$ or W' signal stays at a logic "0" level. In the "read" mode the control signal W' is at a logic "0" level. This forces the feedback transmission switch 74 comprising MOSFETS T7 and T8 to remain "on" and command signals $Y_1$ and S' are at a logic "1" level. The waveforms shown in FIG. 5 indicate that the address command signal $\overline{Y_1S'}$ goes to a logic "0" level first turning the P-channel MOSFET T2 "on" followed by the N-channel MOSFET T1 by the application of the command signal $Y_1S'$. This operation is necessary in the "read" mode in order to effect a nondestructive readout of the logic stored in the memory cell 1/1 onto the internal data line $IDL_1$ because it has been observed that switching of the transmission switch 72 in a step function manner with a capacitive load on the internal digit data line $IDL_1$ causes a condition to exist which is similar to that of a short circuit which will change the state of the memory cell. However, by turning MOSFET T2 "on" first, followed by T1, a gradual or relatively slow circuit connection is made between the input digit data $IDL_1$ and node 1, which will not effect a destructive readout of the logic level appearing at node 1.

Figure 9:
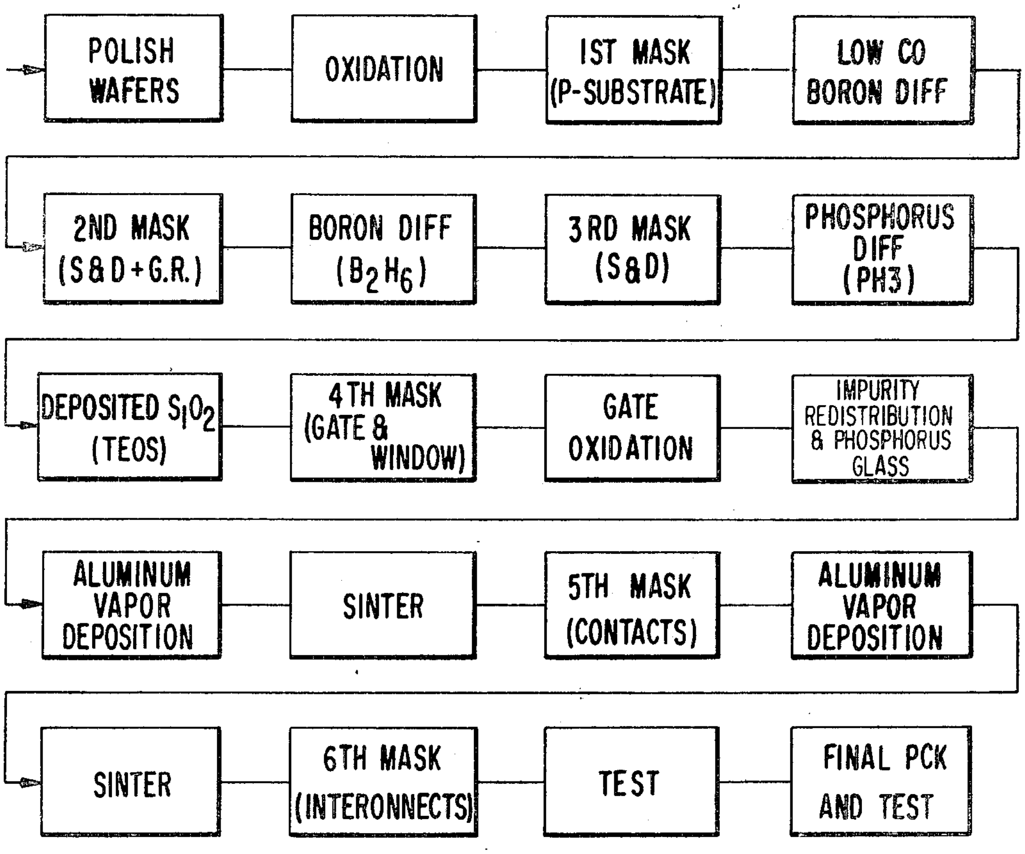
FIG. 9 is a flow chart illustrative of the method of making the integrated circuit memory shown in FIGS. 1–2.

Nondestructive readout of the memory cell shown in FIG. 8 is also achieved by additionally reducing the relative size of the transistors on the substrate comprising the memory cells in the array 48 and the internal data line drivers 54/1, etc., by the fabrication method illustrated in FIG. 1 and outlined in the process taught in the steps outlined in FIG. 9. This minimizes the capacitive load on the internal digit data lines $IDL_1$ . . . $IDL_{18}$ as compared to the relatively large capacitance on the external digit data line $EDL_1$ . . . $EDL_{18}$. In order to further reduce the capacitance on the internal data lines, for example $IDL_1$, a bidirectional data line driver circuit 54/1 such as shown in FIG. 7 is utilized which operates as a buffer between $EDL_1$ and $IDL_1$. Referring now to the data line driver circuit 54/1 disclosed in FIG. 7, it is comprised of two sections, a write driver section 76 including MOSFETS T10 through T16 inclusive and a read driver section 78 including MOSFETS T20 through T26 inclusive. The read and write driver sections 76 and 78 are identical circuits; however, they face in opposite directions so that the write driver 76 is adapted to provide data flow from $EDL_1$ to $IDL_1$. This is due to the fact that the gate terminals of MOSFETS T14 and T16 are commonly connected to the external data line $EDL_1$ while the drains of MOSFETS T10 and T11 are commonly connected to the internal data line $IDL_1$. With respect to the read driver section 78, the internal data line $IDL_1$ is commonly connected to the gates of MOSFETS 24 and 26 and the drains of MOSFETS 20 and 21 are commonly connected to the external data line $EDL_1$.

Since both circuits are identical in configuration, the interconnection of for example only the write driver section 76 will be considered. MOSFETS T10, T11 and T12 are connected in series by means of their respective source and drain terminals between the supply potential B+ and ground. MOSFET T10 is a P-channel device and has its gate directly connected to the gate of the N-channel MOSFET T12. The source terminal of MOSFET T11 and the drain of MOSFET T12 are connected directly together. MOSFETS T13 and T14 are two P-channel devices coupled together in parallel with the common drain terminals being directly connected to the gates of MOSFETS T10 and T12. MOSFETS T15 and T16 are two N-channel devices connected in series circuit relationship between ground and the aforementioned connection of the drains of MOSFETS T13 and T14 and the gates of MOSFETS T10 and T12. The supply potential B+ is commonly applied to the source terminals of MOSFETS T10, T13 and T14. As noted above, the gates of MOSFETS T14 and T16 are commonly connected to the external data line $EDL_1$ and the drain terminals of MOSFETS T10 and T11 are commonly connected to the internal data line $IDL_1$. A read/write control signal, for example W', is connected to the gates of MOSFETS T13, T15 and T11. It is significant to note that MOSFETS T11 and T15 are N-channel devices whereas MOSFET T13 is a P-channel device.

It should also be observed that the read/write control signal $\overline{W'}S$ is applied to the gates of the P-channel MOSFET T23 and the two N-channel MOSFETS 21 and 25 of the read driver section 78 as opposed to the signal W' applied to the write section 76.

Four conditions of operation exist for the data line driver circuits and particularly 54/1 which has been considered as one of the 18 identical circuits. First there is what is defined as the "inactive state" where the applied read/write control signal W' is a logic "0" and the strobe control signal S is a logic "0." In actuality, the only requisite is that S be a logic "0."In this condition, the information contained in memory cells 1/1 . . . 16/1 coupled to the internal digit data line $IDL_1$ as shown in FIG. 2 is not made available at the external data line $EDL_1$. This is due to the fact that the write driver section 76 cannot translate data flow from the internal digit data line $IDL_1$ to the external digit data line $EDL_1$. Therefore, the only consideration that is required is with the read driver section 78. Since S is "0," the control signal $\overline{W'}S$ must also be equal a logic "0." MOSFET T23 then turns "on" because it is a P-channel device whereas T21 and T25 turn "off" due to the fact that they are N-channel devices. The conduction of MOSFET 23 applies B+ to the gate of MOSFET T20 which also turns "off." MOSFET T22 becomes isolated and becomes nonconductive because of the "off" condition of MOSFET T21. In this condition, the external digit data line $EDL_1$ coupled to the drain terminals of transistors T20 and T21 are open circuited, thus providing the required isolation from the internal digit data line $IDL_1$.

The next condition of operation to be considered is the "-write" mode wherein data established on the external digit data line $EDL_1$ is translated to the internal data line $IDL_1$ of the memory array 48 shown in FIG. 1 and is fed into the memory cells 1/1, 2/1, 3/1, etc., when selectively addressed by the address control signals $Y_1S'$, $\overline{Y_1S'}$, $Y_1W'$, etc., and $Y_2S'$, $\overline{Y_2S'}$, etc. In the "write" mode, the read/write control signal W applied is a logic "1" indicative of a write condition. The strobe control signal S is also at a logic "1" level. In this condition, the signal $\overline{W'}S$ is a logic "0" and constitutes a disabling signal for the read driver section 78. On the other hand, the W' signal is also a logic "1" and constitutes an enabling signal to the write driver circuitry 76 comprising MOSFETS T10–T16. Considering the case where it is desirable to read a logic " 0" into a memory cell, for example cell 1/1, the voltage at $EDL_1$ is at ground or 0 volts. This situation causes the P-channel MOSFET T13 to turn "off" and T14 to turn "on." The W' control signal causes the N-channel MOSFET T15 to turn "on" while N-channel T16 turns "off." The B+ potential existing at the gate of the P-channel MOSFET T10 also causes it to turn "off." However, N-channel MOSFETS T11 and T12 turn "on," thereby placing the internal data line $IDL_1$ at ground or zero potential which is a logic "0" level due to the conduction of MOSFETS T11 and T12. Thus the external digit data line $EDL_1$ and internal digit data line $IDL_1$ have the same logic state, i.e., a logic "0." Effectively, MOSFETS T14 and T16 act as a first complementary MOSFET inverter circuit while MOSFETS T10 and T12 act like a second complementary MOSFET inverter circuit in series with it.

Consider next the "read" mode where the read/write control signal W' is a logic "0" and the strobe control signal S is a logic "1." This provides a signal where $\overline{W}'S$ is "1" which is an enabling signal for the read driver 78. The write driver circuitry 76 is disabled due to W'="0" and constitutes an open circuit between the external digit data line $EDL_1$ and the internal digit data line $IDL_1$. Since a logic "0" signal was considered during the "write" mode, an opposite readout of a logic "1" will now be considered. In this condition a memory cell, for example cell 1/1, is addressed and the transmission switch 72 is closed and B+ potential appears on the internal digit data line $IDL_1$. The occurrence of the signal $\overline{W}'S$="1" causes the P-channel MOSFET T23 to turn "off" as does T24. The B+ potential appearing at the gates of MOSFETS T25 and T26 causes them to turn "on" placing the gates of MOSFET T20 and T22 at ground potential. This effects turn-on of the P-channel MOSFET T20 while T22 turns "off." The conduction of MOSFET T20 thereby connects the B+ potential applied to its source electrode to the external digit data line $EDL_1$ accomplishing the desired result, i.e., B+ potential simultaneously at $EDL_1$ and $IDL_1$.

An intermediate state exists wherein data on an external digit data line, for example $EDL_1$, is available at the internal data line $IDL_1$. However, storage is not accomplished due to the inhibition of the input of the transmission switches in the memory cells 1/1 . . . 16/1 which, for example, could be transmission switch 72 of memory cell 1/1 comprising MOSFETS T1 and T2 disclosed in FIG. 8. This occurs due to the fact that the strobe control signal S' remains a logic "0," in spite of the fact that the read/write control signal W' is a logic "1," thereby enabling the write driver circuitry 76 as previously explained. The read driver circuitry 78 on the other hand is disabled because the control signal $\overline{W}'S$ is a logic "0" which as previously explained, turns off MOSFETS T20 and T21. Since the input/output transmission switch 72 remains in an "off" state, no data transfer can occur to or from the cell 1/1 even though it is addressed by the occurrence of appropriate $Y_1$ address signals.

Thus far what has been considered is the operation of the bidirectional read/write driver circuit shown in FIG. 7. Additionally, it should be noted, however, that it is an important object of the present invention to minimize circuit capacitance at the internal digit data line IDL in order to achieve nondestructive readout of the memory cells connected thereto. As was pointed out earlier, the capacitance can be minimized by fabricating the MOSFETS in as small a size as possible. This is accomplished by reducing the channel width-to-length ratio. In the embodiment of the data line driver 54/1 shown in FIG. 7, all MOSFETS disclosed therein are of minimum size, i.e., are comparable to the size of the memory cell MOSFETS with the exception of MOSFETS T20, T21 and T22 which are connected to the relatively large external capacitance of the external digit data line $EDL_1$. Accordingly, the MOSFET transistors T20, T21 and T22 are fabricated on a semiconductor substrate so that they have a channel width-to-length ratio of approximately 20 as opposed to all others which may have a ratio in the order of 1. By utilizing a bidirectional data line driver such as shown in FIG. 7 and having MOSFETS T20, T21 and T22 fabricated as relatively large devices in comparison to all other MOSFET devices considered heretofore in connection with the subject invention, there results a high output conductance to the external digit data lines, e.g., $EDL_1$ which results in fast switching and data transfer with nondestructive readout. Secondly, isolation between the small internal devices is achieved between the relatively large external line capacitance existing on the external data lines. Increased noise immunity results and an open circuit is provided between the memory array and the external data lines during the inactive state.

The process by which the subject invention is fabricated on a semiconductor substrate is disclosed in FIG. 9 and involves a series of diffusions, gate oxide growth and passivation, contact window etching, and metallization and delineation of the interconnect pattern which is well known to those skilled in the art. A double metallization procedure (aluminum vapor deposition) however is utilized in the subject invention to minimize contamination of the gate oxide layers 24 and 38 shown in FIG. 1 and to minimize the density of pin holes in these oxide layers.

What has been shown and described, therefore, is an improved nondestructive readout random access memory which is achieved by having the memory cell array of the address decoding circuitry, the input/output buffer circuits including the data line drivers and control logic circuits all integrated on a single chip. Therefore, a plurality of identical chips can be stacked in parallel and coupled to the six input sources $A_1$ . . . $A_4$, W and S further reducing the physical space requirements while still increasing the density of the semiconductor devices contained therein.

We claim as our invention:

1. An integrated circuit memory having at least four externally applied binary address signals $A_1$, $A_2$, $A_3$ and $A_4$, a binary read/write control signal W and a binary strobe control signal S having a predetermined timed relationship relative to each other and being powered from one power supply potential and coupled to at least one input/output external data line and being operative to translate binary data signals to and from the external data line comprising, in combination:

a. a plurality of MOSFET memory cells forming a matrix array and defining a predetermined number of words having a predetermined number of bits per word and wherein each bit comprises at least one MOSFET memory cell;

b. an input/output internal data line coupled to the same respective bit of all said predetermined number of words in said array;

c. an input/output data line driver circuit coupled between said internal data line and said external data line and operating to gate binary data signals to and from said internal line in response to a first and a second enabling control signal $\overline{W}'S$ and W' and providing isolation for each MOSFET memory cell coupled to said internal data line from said external data line and the relatively large external capacitance thereof;

d. at least one input/output control logic circuit coupled to said read/write control signal W and said strobe control signal S including circuit means generating a control signal W' wherein a binary logic "1" defines a write control and a logic "0" defines a read control, an S' control signal wherein a logic "1" defines a strobe control of said memory cells, and a $\overline{W}'S$ control signal wherein a logic "1" defines an enabling of said data line driver circuit in said read mode, and including circuit means coupling said W' and said $\overline{W}'S$ signal to said data line driver circuit to control binary data flow between said external and internal data line; and e. an address decoding logic circuit coupled to said binary address input signals $A_1$, $A_2$, $A_3$ and $A_4$ and said signal W' and said signal S' generated in said input/output control logic circuit, being responsive thereto and generating four address control logic signals YS', $\overline{YS}'$, YW' and $\overline{YW}'$ and including four word address lines coupling said four address control logic signals to each MOSFET memory cell of a word in the memory cell array to control the address and operation of the memory cells simultaneously to selectively read, write and store information translated to and from said internal data line.

2. The invention as defined by claim 1 wherein said array of MOSFET memory cells, said internal data line, said input/output data line driver circuit, said input/output control logic circuit, and said address decoding circuit are all fabricated on a single semiconductor substrate.

3. The invention as defined by claim 1 wherein said read/write control signal S occurs first in time relative to said strobe control signal S and wherein each MOSFET memory cell comprises:

a. a MOSFET flip-flop circuit having a first and a second signal terminal;
b. an input/output transmission switch coupled between said internal data line and said first signal terminal, said transmission switch comprising a first pair of MOSFETS having gate, drain and source terminals and coupled together in parallel between their respective drain and source terminals;
c. first circuit means coupled to said address decoding logic circuit coupling the gate terminal of one MOSFET of said first pair of MOSFETS to said address control logic signal YS' and the gate terminal of the other MOSFET of said first pair of MOSFETS to said address control logic signal $\overline{YS}$';
d. a second pair of MOSFETS having gate, drain and source terminals coupled in parallel by their respective drain and source electrodes between said first and second signal terminal of said flip-flop; and
e. second circuit means coupled to said address decoding logic circuit coupling the gate terminal of one MOSFET said second pair of MOSFETS to said address control logic signal YW' and the gate terminal of the other MOSFET of said second pair of MOSFETS to said address control logic signal $\overline{YW}$'.

4. The invention as defined by claim 3 wherein said first and second pair of MOSFETS are each comprised of a complementary pair of MOSFETS 5. The invention as defined in claim 4 and wherein said address decoding circuit additionally includes circuit means for delaying the address control logic signal YS' by a predetermined time interval with respect to the address control logic signal $\overline{Ys}$', thereby operating the input/output transmission switch of said memory cell by first operating one MOSFET of said complementary pair by the application of the signal YS' and then the other MOSFET of said complementary pair by the application of said signal $\overline{YS}$.

6. The invention as defined by claim 5 wherein said one MOSFET of said first pair of complementary MOSFETS defining the input/output transmission switch comprises a P-channel device and said other MOSFET of said first pair of complementary MOSFETS comprises an N-channel device.

7. The invention as defined by claim 4 wherein said one MOSFET of said second pair of complementary MOSFETS defining the feedback transmission switch comprises an N-channel device and wherein said other MOSFET of said second pair of complementary MOSFETS comprises a P-channel device.

8. The invention as defined by claim 7 and wherein said address decoding circuit additionally includes circuit means for delaying the address control signal YW' by a predetermined time interval with respect to the signal $\overline{YW}$'.

9. The invention as defined by claim 1 wherein said address decoding circuit comprises:

a. a first plurality of logic inverter circuits coupled to the address input signals $A_1$, $A_2$, $A_3$, $A_4$ and providing outputs of $\overline{A}_1$, $\overline{A}_2$, $\overline{A}_3$ and $\overline{A}_4$;
b. at least a first and second NAND logic circuit coupled to said first plurality of logic inverters and being responsive to the signals $A_1$ and $A_2$, and $A_3$ and $A_4$ respectively, to provide respective X level output signals;
c. at least one NOR circuit coupled to said first and second NAND circuit, being responsive to the said respective X level output signals to provide a Y level output signal;
d. a third and a fourth NAND circuit both coupled to said at least one NOR circuit being responsive to said Y level output signal, said third NAND circuit additionally coupled to said control logic circuit and being responsive to said signal S' to generate said address control signal $\overline{YS}$', said fourth NAND circuit additionally coupled to said control logic circuit and being responsive to said signal W' to generate said address control signal $\overline{YW}$'; and
e. a second plurality of inverter circuits respectively coupled to said third and fourth NAND circuit to respectively generate address control signals YS' and YW'.

10. The invention as defined by claim 1 wherein said input/output control logic circuit comprises:

a. a first and a second logic inverter circuit coupled to said strobe control signal S and said read/write control signal W and respectively generating output signals $\overline{S}$ and $\overline{W}$;
b. a third and a fourth inverter circuit respectively coupled to the output of said first and said second inverter circuit and generating said control signals S' and W'; and
c. a NOR logic circuit coupled to the output of said first logic inverter circuit and the output of said fourth logic inverter circuit, being responsive to the signals $\overline{S}$ and $\overline{W}$' and generating said control signal $\overline{W}$'S.

11. The invention as defined by claim 2 wherein said single semiconductor substrate includes both P-channel and N-channel MOSFETS fabricated adjacently thereon, each MOSFET having a source and drain diffusion region and wherein an N-channel MOSFET includes a guard ring diffusion region intermediate a P-channel MOSFET and wherein a relatively thick oxide layer extends between the respective drain diffusion regions of the N-channel and the P-channel MOSFET to minimize the internal interconnection line capacitance and eliminate parasitic surface channels.

12. The invention as defined by claim 11 wherein said N-channel MOSFET and said P-channel MOSFET have a channel width-to-length ratio in the order of 1.

13. The invention as defined by claim 12 wherein said substrate comprises <100> or <111> orientation N-type silicon.

* * * * *